US007509684B2

(12) United States Patent
McDonald et al.

(10) Patent No.: US 7,509,684 B2
(45) Date of Patent: Mar. 24, 2009

(54) STRATEGIES FOR SANITIZING DATA ITEMS

(75) Inventors: Orville C. McDonald, Seattle, WA (US); Xiaoan Wang, Sammamish, WA (US); Marcelo M. De Barros, Redmond, WA (US); Richard K. Bonilla, Redmond, WA (US); Qi Ke, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 10/962,223

(22) Filed: Oct. 9, 2004

(65) Prior Publication Data

US 2006/0080554 A1    Apr. 13, 2006

(51) Int. Cl.
*G06F 7/04* (2006.01)
*G06F 17/30* (2006.01)
(52) U.S. Cl. .................. 726/26; 707/9; 726/22
(58) Field of Classification Search .......... 713/189; 726/6, 26
See application file for complete search history.

(56) References Cited

U.S. PATENT DOCUMENTS

| 6,253,203 | B1 * | 6/2001 | O'Flaherty et al. ............ 707/9 |
| 2004/0103147 | A1 * | 5/2004 | Flesher et al. ............... 709/204 |
| 2005/0021488 | A1 * | 1/2005 | Agrawal et al. ............... 707/1 |
| 2005/0049991 | A1 * | 3/2005 | Aggarwal et al. ............. 707/1 |
| 2006/0218111 | A1 * | 9/2006 | Cohen ...................... 706/45 |
| 2007/0055482 | A1 * | 3/2007 | Goodermote et al. ........ 702/184 |

OTHER PUBLICATIONS

Transforming Data to Satisfy Privacy Constraints Vijay Iyengar, pp. 279-288 SIGKDD'02 Edmonton, Alberta, Canada.*

Agrawal et al. "On the Design and Quantification of Privacy Preserving Data Mining Algorithms," Symposium on Principles of Database Systems, Proceedings of the twentieth ACM SIGMOD-SIGACT-SIGART symposium on Principles of database systems, ACM Press, New York, NY, 2001, pp. 247-255.

Agrawal et al., "Privacy-Preserving Data Mining", ACM SIGMOD Record, vol. 29, Issue 2, Jun. 2000, pp. 439-450.

Islam et al., "A Framework for Privacy Preserving Classification in Data Mining," ACM International Conference Proceeding Series, Proceedings of the second workshop on Australasian information security, Data mining and Web Intelligence, and Software Internationalisation, vol. 32, 2004, pp. 163-168.

(Continued)

*Primary Examiner*—Nasser G Moazzami
*Assistant Examiner*—Rebecca L Pachura
(74) *Attorney, Agent, or Firm*—Lee & Hayes, PLLC

(57) ABSTRACT

Strategies are described for sanitizing a data set, having the effect of obscuring restricted data in the data set to maintain its secrecy. The strategies operate by providing a production data set to a sanitizer. The sanitizer applies a data directory table to identify the location of restricted data items in the data set and to identify the respective sanitization tools to be applied to the restricted data items. The sanitizer then applies the identified sanitization tools to the identified restricted data items to produce a sanitized data set. A test environment receives the sanitized data set and performs testing, data mining, or some other application on the basis of the sanitized data set. Performing sanitization on a sanitized version of the production data set is advantageous because it preserves the state of the production data set. The data directory table also provides a flexible mechanism for applying sanitization tools to the production data set.

17 Claims, 7 Drawing Sheets

OTHER PUBLICATIONS

Evfimievski, "Randomization in Privacy Preserving Data Mining," ACM SIGKDD Explorations Newsletter, vol. 4, Issue 2, Dec. 2002, pp. 43-48.

Wu et al., "Privacy Preserving Database Application Testing," WPES'03, Oct. 20, 2003, Washington, DC, Proceedings of the ACM workshop on Privacy in the electronic society, 2003, pp. 118-128.

* cited by examiner

STRATEGIES FOR SANITIZING DATA ITEMS

TECHNICAL FIELD

This subject matter relates to strategies for obscuring data items in a data set to prevent such data items from being revealed to unauthorized parties, thereby "sanitizing" the data items.

BACKGROUND

In today's information age, various electronic systems maintain a large amount of information regarding individuals that should be kept in confidence (where such information is generally referred to herein as "restricted data items"). Government institutions administer many such electronic systems, while the private sector (such as various financial institutions) administers many other such electronic systems. The restricted data items can include information that identifies the individuals, such as the individuals' names, telephone numbers, residential addresses, Email addresses, and so forth. The restricted data items can also include information regarding the individuals' financial assets (such as account numbers, income, etc.), their financial transactions, their various debts, their subscriptions, their medical histories, their insurance records, and so forth. It is paramount that the electronic systems protect the privacy of all restricted data items, as the release of such information to unauthorized parties can have negative consequences to the individuals. Identity theft is just one concern regarding the inappropriate release of restricted data items.

At the same time, various parties also have a legitimate need to gain access to these electronic systems. In one case, a tester may wish to test the electronic systems to ensure that the systems are working properly. For instance, before deploying updated functionality, a tester may want to test this functionality in a lab environment before deploying the functionality in a production environment. (As used in the art, the term "production environment" refers to the infrastructure used to deliver services to clients in the normal course of the environment's day-to-day activities. A "lab environment" refers to infrastructure specifically set up to test code functionality. The lab environment is preferably designed to mimic the production environment; for instance, it is common to construct the lab environment so that it is a scaled down version of the production environment.) In another application, a tester may wish to perform forecasting-type testing on an electronic system to determine how it will behave in the future, for example, in response to higher loads than it currently handles.

In another application, an analyst may wish to investigate the data maintained by the electronic systems for various purposes. For instance, a government analyst may wish to examine databases maintained by a government organization to determine economic trends, population-related trends, and so forth. A private sector analyst may wish to examine databases to determine marketing trends, cross-selling and up-selling opportunities, and so forth.

The administrators of electronic systems often cannot provide unrestricted access to their systems to accommodate the above needs. This is because the administrators are often under legal and/or contractual obligations to maintain the secrecy of the restricted data items. For this reason, administrators must look to alternative strategies for allowing various legitimate parties to interact with their systems.

In one such alternative approach, the administrators can generate a mock electronic system. The entire mock system is synthesized so that it resembles the original electronic system deployed in the production environment in some respects, but the mock system otherwise omits the restricted data items or provides "fake" restricted items in the place of actual restricted data items. The administrators can then allow outside parties to interact with the mock system by performing tests on the mock system and by analyzing the data stored by the mock system. The expectation behind this technique is that the mock system will have characteristics that statistically track the production system, so that a user's interaction with the mock system will serve as a meaningful "surrogate" for the user's precluded interaction with the actual production system. For example, there is an expectation that, if a series of tests performed on the mock system's database yields error-free results, then the production system will not experience problems when it is deployed.

However, the above-described expectations may not always hold up. As appreciated by the present inventors, production systems may enter unexpected states for reasons that are not immediately fully understood. Because these states are not anticipated, this also means that the synthesized mock system may not duplicate these states (because the mock system has not been designed to account for these states). This, in turn, means that the tests performed on the mock system may not account for the complete behavior of the actual production systems. This is a problem of significant weight, as the consequences of leaking personal information due to an unpredicted malfunction in the production system can be dire.

There is accordingly an exemplary need for more efficient and effective techniques for allowing various parties to interact with an electronic system which stores restricted data items, without revealing the restricted data items to those parties.

SUMMARY

According to one exemplary implementation, a method is described for sanitizing restricted data items in a data set to prevent the revelation of the restricted data items. The method comprises: (a) transferring an original data set from a production environment to a sanitizer, the original data set characterized by a state; (b) sanitizing the original data set using the sanitizer, while preserving the state of the original data set, by: (b-i) identifying the locations of the restricted data items in the original data set; (b-ii) identifying at least one sanitizing tool to apply to the restricted data items; and (b-iii) applying the sanitizing tool to the restricted data items; and (c) forwarding the sanitized data set to a target environment.

According to another exemplary feature, the target environment is a testing environment in which a tester applies a test to the sanitized data set.

According to another exemplary feature, the target environment is a data mining environment in which an analyst applies mining analysis to the sanitized data set.

According to another exemplary feature, the identifying of the locations of the restricted data items comprises using a data directory table to identify the locations of the restricted data items in the original data set.

According to another exemplary feature, the identifying of the sanitizing tool comprises using the data directory table to identify the sanitizing tool.

Additional exemplary implementations are described in the following.

Figure 1:
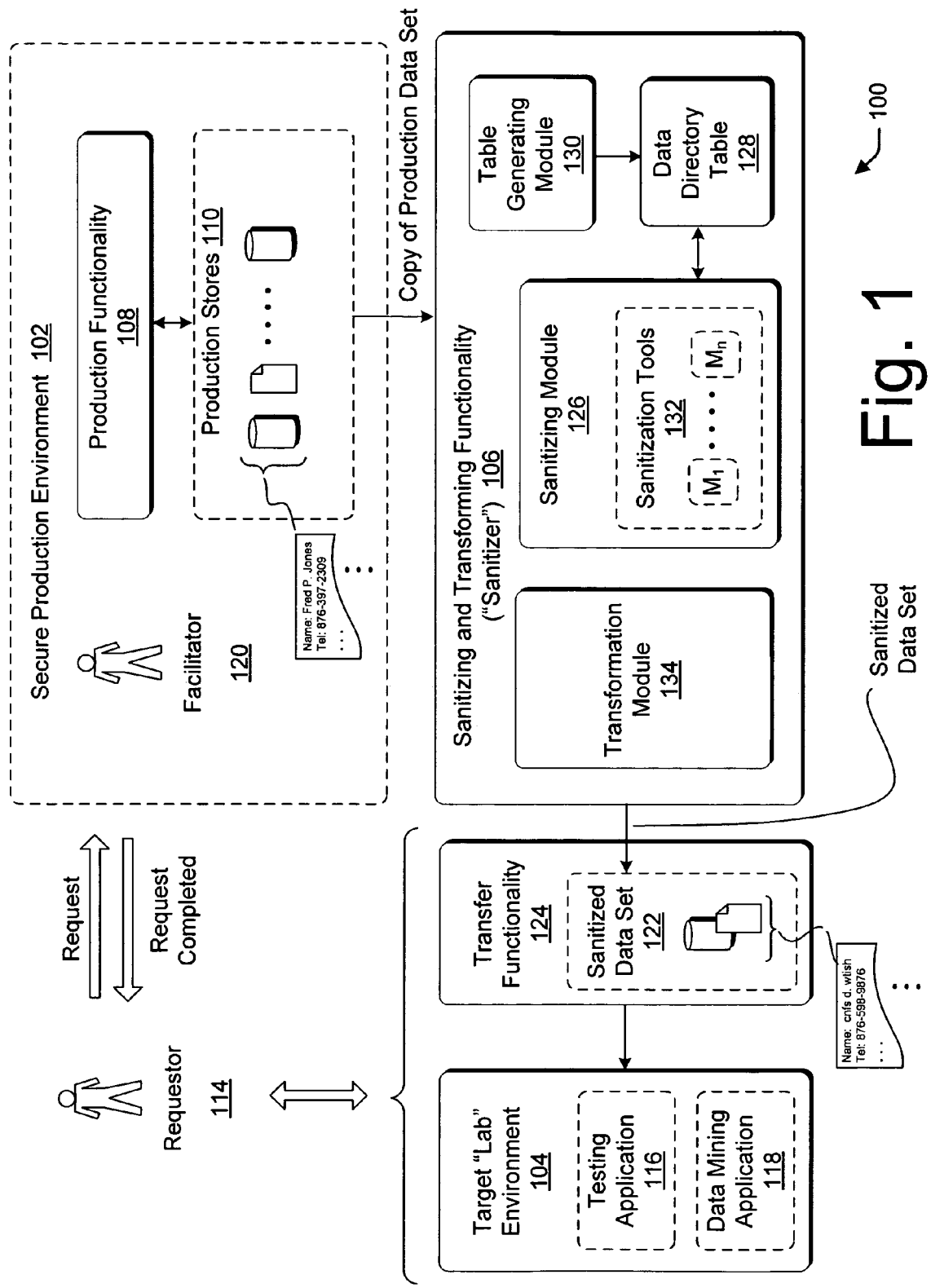
FIG. 1 shows an overview of a system for sanitizing data items.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth exemplary strategies for sanitizing data items. Instead of synthesizing an entire mock version of a production data set from scratch, the strategies described herein directly modify a copy of the production data set itself (or some subset of the production data set). To perform this task, the strategies described herein employ a data directory table. The data directory table identifies the locations of instances of restricted data items in the data set. The data directory table also identifies various sanitization tools that should be applied to sanitize the restricted data items. The strategies for sanitizing data items may also transform the data items in various ways. For instance, relative to the original production data set, the strategies can expand or compress the data set in various ways in addition to sanitizing the data set.

The sanitization strategies described herein have numerous advantages. According to one advantage, by virtue of the fact that the sanitized data set is built from a copy of the production data set, it is more likely to preserve the precise state of records found in the production data set. Accordingly, there is no a priori need for a tester to fully understand how the production data set entered such states in order to perform tests and analyze the production data set.

Further, the use of the data directory table provides a flexible mechanism for sanitizing data items. Using such a table, a tester or analyst can quickly and easily modify the sanitization operation to account for changes in schema in the production data set. Also, the table provides a convenient means for quickly and easily changing the sanitization tools that are applied to particular pieces of restricted data.

Other features and attendant benefits will be set forth in the following description.

As to terminology, the term "restricted data items" is intended to have broad connotation. It generally refers to any kind of information that should be restricted from one or more parties for any reason. The status of restricted data items depends on the expectations appropriate to different real-world environments, which may evolve over time. Thus, the term "restricted data items" should not be construed as referring to some inherent property of the information, but should rather be liberally construed as referring to whatever information that an entity maintaining the data items wishes to conceal for any reason whatsoever.

It is nevertheless possible to identify certain common exemplary categories of restricted data items. One such general category is Personal Identifiable Information (PII). PII data items are data items that uniquely identify individuals. This category can also include pseudonymous identifiers (e.g., various unique identifiers) and billable account IDs. Other restricted data items fall under the category of "sensitive data items." Sensitive data items are data items that are confidential but not considered PII data items, such as financial and health information.

To provide merely one illustrative and non-limiting example, an exemplary production system may classify the following data items as either PII data items, sensitive data items, or non-restricted data items (e.g., neither PII data items nor sensitive data items) in the following manner:

TABLE 1

Exemplary Restricted Nature of Certain Data items

| Data Item | Type of Data | PII? | Sensitive? |
|---|---|---|---|
| Customer PUID | Account | Yes | No |
| Billable Account Id | Account | Yes | No |
| Passport Member Name | Account | Yes | No |
| Name (First, Last, Pronunciations) | Account | Yes | No |
| Email | Account | Yes | No |
| Company Name | Account | Yes | No |
| Locale | Account | No | No |
| Phone | Account | Yes | No |
| Address (Friendly Name) | Account | Yes | No |
| Address (Street) | Account | Yes | No |
| Address (City) | Account | No | No |
| Address (District) | Account | No | No |
| Address (Country Code) | Account | No | No |
| Address (Postal Code) | Account | No | Yes |
| Tax Exemption Information | Account | No | Yes |
| Payment Instrument (PI) - Credit Card | Account | No | Yes |
| PI - Debit Card | Account | No | Yes |
| PI - Wholesale (External Customer) | Account | No | Yes |
| PI - Prepaid Card | Account | No | Yes |
| Banned User List | Account | Yes | No |
| Subscriptions (includes Service Instances) | Subscription | No | No |
| Referral Data | Subscription | No | No |
| Comments | Comments | Yes | No |
| Billing History | Billing History | No | Yes |

The purpose of the sanitization strategies described herein, as applied to the exemplary production environment characterized by Table 1, is to obscure the nature of any restricted data items, including any PII data items and sensitive data items. The sanitizing strategies may optionally leave unrestricted data items "as is," that is, without modification.

The term "sanitization" and "obscuration" should likewise be construed broadly herein. Sanitization refers to any modification of restricted data items in a manner that conceals some characteristic of the data items to an unauthorized party. In one technique, the sanitization strategies can completely randomize the restricted data items such that these items no longer convey any intelligible information. This can be performed by replacing the restricted data items with random strings of alphanumeric characters. In another technique, the sanitization strategies can replace restricted data items with information that is per se intelligible, but fails to otherwise provide enabling confidential information that can be used for nefarious ends. This can be performed, for instance, by scrambling record items in a database, or by substituting fictitious entries for certain pieces of restricted data items. As a result of these measures, it is not possible for an unauthorized party to reconstruct complete records and use the records to the disadvantage of the account holders.

Whatever techniques are used, the sanitization strategies preferably conceal the restricted data items, while, at the same time, preserve as much of the state of the original production data set as possible. As used herein, "state" refers to the attributes or features of records in the data set. For example, assume that a record indicates that an individual, Fred P. Jones from Syracuse, N.Y., subscribes to two online services offered by a particular company. The sanitization strategies would preferably modify the name the individual such that the sanitized data set does not reveal his name, at least in connection with this particular record. But the sanitization strategies might otherwise attempt to preserve certain features of this record, such as the fact there is "someone" from upstate New York who subscribes to two services. In obscuring the name, Fred P. Jones, the sanitization strategies might also attempt to preserve certain statistical features of this individual's name, such as by substituting a name that has the same number of characters or a name that preserves certain special characters in the name (such as a hyphen). This better ensures that tests and analysis performed on the sanitized data set will mirror results that would have been obtained had such tests and analysis been performed on the original un-sanitized production data set.

The term "data set" refers to any collection of data items. A data set may be restricted to a particular repository of data items, such as a particular database maintained by a particular server. Or the data set may encompass records maintained by several different repositories of data items, possibly maintained by several different servers. Where the data set derives from particular repositories of data items, it may include all of the records in those repositories, or only some subset thereof. The repositories can include any possible source of data items, such as databases, flat files, comma separated value (CSV) files, and so forth.

This disclosure includes the following sections. Section A describes an exemplary system for sanitizing restricted data items. Section B describes the operation of the system of Section A, and sets forth exemplary scenarios in which the system can be applied. Section C describes an exemplary computer environment for implementing certain aspects of the system of Section A.

A. Exemplary System

Generally, any of the functions described herein can be implemented using software, firmware (e.g., fixed logic circuitry), manual processing, or a combination of these implementations. The terms "module," "component" "functionality," and "logic" as used herein generally represent software, firmware, or a combination of software and firmware. In the case of a software implementation, the terms "module," "component," "functionality," or "logic" represent program code that performs specified tasks when executed on a processing device or devices (e.g., CPU or CPUs). The program code can be stored in one or more fixed and/or removable computer readable memory devices. The memory can be provided at one site or several sites in distributed fashion.

A. 1. Overview of an Exemplary System for Sanitizing Data Items

FIG. 1 shows an overview of an exemplary system 100 for sanitizing data items. The basic objective of the system 100 is to transfer a copy of a data set from a production environment 102, remove restricted data items in the data set, and provide the sanitized data set to a target environment 104. The copy of the data set taken from the production environment 102 is referred to as a "production data set," while the sanitized version of the production data set is referred to as a "sanitized data set." The system 100 relies on sanitizing and transforming functionality 106 to perform the sanitizing. As this discussion will make repeated reference to this component, this component will be referred to below for brevity as simply the "sanitizer" 106. More specifically the role of the sanitizer 106 is to obscure the restricted data items (e.g., PII data items and sensitive data items) in the production data set to provide the sanitized data set. For example, FIG. 1 shows a small excerpt from the production set that identifies the name of one account holder, "Fred P. Jones," as well as this individual's telephone number. The objective of the sanitization process is to modify this kind of personal data such that this information is not revealed to unauthorized parties. At the same time, the sanitizer 106 preserves the state of the production data set. This subsection (A.1) provides an overview of the components of the system 100.

At the outset, it is pointed out that the following discussion will make repeated reference to operations performed "on" the "production data set." It should be kept in mind that the sanitizer 106 can perform operations on a copy of the production data set, or some portion thereof, leaving an original copy of the production data set intact for use in the production environment 102 in the normal course of its operations. More specifically, in one case, the sanitizer 106 can store a copy of the production data set and then perform sanitization operations on this stored copy; in another case, the sanitizer 106 can perform real-time sanitization operations on a retrieved portion of the production data set prior to storage, and then store a copy of the sanitized portion of the production data set. In either case, the production environment 102 maintains an original version of the production data set for normal intended use. (As used herein, the phrase "copy of the production data set" does not necessarily imply that the copy has been formally stored (e.g., in non-volatile storage); for instance, the copy may represent a transient version of the production data set transferred over a line from the production environment 102 to the sanitizer 106, where it may be held in memory and operated on by the sanitizer 106 prior to formal storage in a non-volatile store.)

To begin with, the production environment 102 can pertain to any kind of infrastructure for performing any kind of task. In one case, the production environment 102 may refer to computer-related infrastructure for handling accounting for online services. In this case, the infrastructure can execute various subscription-related tasks, billing-related tasks, and so forth. This is merely one exemplary application. Other production environments 102 may implement applications related to health care management, education-related record keeping, government-related record keeping, and so forth.

In any event, the production environment 102 can include equipment which implements its services. The equipment will typically include a collection of computer devices. Commonly, the equipment will specifically include server-type computers configured with suitable code to provide application-specific functionality to client devices. FIG. 1 generically denotes this computer equipment as "production functionality" 108.

The production environment 102 further includes various repositories of information, denoted generically in FIG. 1 as "production stores" 110. The production stores 110 can be implemented as one or more storage mechanisms, housed at a single site or distributed over plural sites. The production stores 110 can be implemented using any kind of storage media, such as magnetic storage media, optical storage media, solid state storage media, and so forth. The production stores 110 can further be managed using any kind of storage management functionality. The individual repositories in the production stores 110 can be configured as databases, flat files, CSV files, and so forth, as well as any combination of different kinds of repositories.

In the context of the system 100, the term "production data set" can refer to any grouping of data taken from any collection of the production data stores 110. In one case, the production data set may encompass all of the data items stored in the production stores 110. In another case, the production data set may describe some subset of the entire universe of data items stored in the production stores 110, culled based on some criteria. Generally speaking, the production data set will include some data items that have a restricted status and other data items that have a non-restricted status. According to the broad definition provided above, data items are regarded as "restricted" when it has been decided that these items should be concealed from one or more parties, for any environment-specific reason.

A requestor 114 can initiate the sanitization procedure. In the context of a testing scenario, the requestor 114 may represent a test engineer who wishes to perform a test on the production data set. In this case, the sanitizer 106 provides a sanitized version of the production data set (referred to below as the "sanitized data set") to the target environment 104 for testing purposes. At this time, the requester 114 (or some other individual) can apply various testing applications 116 to the sanitized data set. In the context of a data mining scenario, the requester 114 may be an analyst who wishes to perform analysis on the production data set. In this case, the requester 114 (or some other individual) can apply various data mining applications 118 to the sanitized data set. This is an exemplary and non-exhaustive list of applications that can be applied to the sanitized data set.

In the setup shown in FIG. 1, the requestor 114 does not have direct access to the production data set in its original (that is, un-sanitized) form. In other words, only a certain group of people have access rights to the information stored in the production stores 110, and the requestor 114 is not one of these people. Thus, to initiate the sanitization operation, the requester 114 can send a request to a facilitator 120. The facilitator 120 represents an individual who is authorized to access the production data set. Of course, if the requestor 114 has a level of authorization that allows him or her to directly access the production data set, then the role of the facilitator 120 can be eliminated from the system of FIG. 1.

Upon receipt of the request from the requestor 114, the facilitator 120 transfers a copy of the production data set to the sanitizer 106. This operation can be performed by transferring a collection of records from the productions stores 110 to a storage device (not shown) associated with the sanitizer 106. Then, the facilitator 120 commands the sanitizer 106 to sanitize the production data set to produce a sanitized data set 122.

After the production data set is sanitized, the sanitizer 106 transfers the sanitized data set 122 to transfer functionality 124. At this point, the system 100 can send a notification to the requestor 114. The notification alerts the requestor 114 to the fact that the sanitizing operation has been completed. The system 100 can send the notification in a manual or automated manner. In the manual technique, the facilitator 120 can manually send an alert message to the requestor 114. In the automatic technique, the sanitizer 106 can automatically send the alert message to requestor 114 when it finishes sanitizing the data items.

Upon receipt of the alert message, the requestor 114 can then initiate the transfer of the sanitized data set 122 to the target environment 104. As mentioned above, the requestor 114 (or some other individual) can then apply various applications to the sanitized data set 122, such as the testing application 116, the data mining application 118, or some other application. The sanitized data set 122 can be stored in the test environment 104 as one or more databases, one or more flat files, one or more CSV files, and so forth, or some combination thereof. In one case, the sanitizer 106 selects an output format for the sanitized data set 122 that matches the format of the production data set in the production environment 102. In other cases, the sanitizer 106 can select an output format for the sanitized data set 122 that differs from the format of the production data set in the production environment 102.

Figure 7:
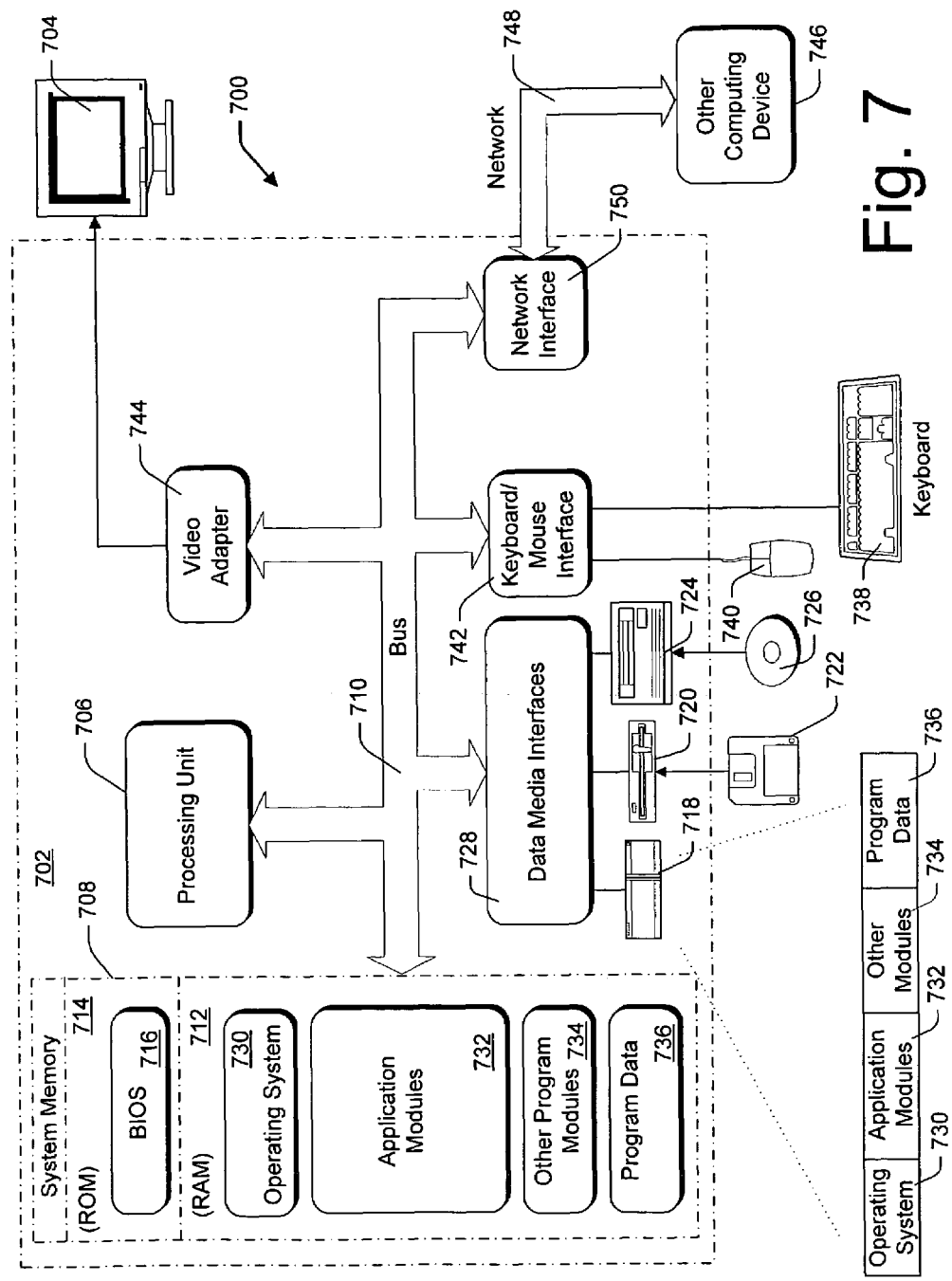
FIG. 7 shows an exemplary computing environment for implementing aspects of the system shown in FIG. 1.

The various functional components of FIG. 1 can be implemented using different equipment. As mentioned above, the production environment may represent one or more server-type computers in cooperative engagement with one or more storage mechanisms. Similarly, each of the other components in FIG. 1 (e.g., the sanitizer 106, the transfer functionality 124 and the target environment 104) can be implemented as one or more server-type computers in cooperative engagement with one or more storage mechanisms. A server computer is a computer that includes functionality that configures it to perform server-related tasks. It can include conventional hardware, such as one or more processors, RAM memory, ROM memory, various interface mechanisms, various buses, various input devices, and so forth. FIG. 7 provides an example of a computer that can be used to implement any of the functions associated with the sanitizer 106, transfer functionality 124, target environment 104, and so forth.

As a final topic in this introductory section, the production data set may represent a relatively large collection of data items. To address this issue, the system 100 may include special provisions for efficiently and reliably transmitting this data set through the system 100. In one case, a human operator can store the data set on removable media and physically transport this media to different parts of the system. For instance, the facilitator 120 can physically transport a copy of the production data set to the sanitizer 106, and when the sanitizer 106 has completed its operation, the facilitator 120 can transfer the sanitized data set to the transfer functionality 124. Similarly, the requestor 114 can physically transport the sanitized data set 122 from the transfer functionality 124 to the target environment 104.

In another case, the various components in the system 100 can transfer the data sets as electronic signals over a coupling mechanism, such as a point-to-point coupling mechanism, a digital network of any type (e.g., an TCP/IP intranet, an Ethernet network, etc.), and so forth. To facilitate this exchange, a transmitting component (e.g., the production environment 102) can transmit the data set in piecemeal fashion to a destination component (e.g., the sanitizer 106). In this arrangement, the transmitting component can transmit blocks of the data set having a defined size and at a defined frequency of transmission. Alternatively, or in addition, the destination component can prompt the transmitting component to transmit any new data items to be processed if the destination component has not received any data items from the transmitting component in a prescribed amount of time.

For example, consider the case where the production environment 102 initially transfers a complete copy of the production data set to the sanitizer 106 for sanitization. It can do this by transmitting a series of data blocks of prescribed size at predetermined time intervals. After this main transfer operation, the production environment 102 may update the production data set in the normal course of its production activities, resulting in a delta-quantity of production data items that have yet to be sanitized. Upon failing to receive any data items from the production environment 102 in a certain amount of time (e.g., in 24 hours), the sanitizer 106 can independently poll the production environment 102 to retrieve and process this delta-quantity of production data items.

In the above example, the sanitizer 106 can store an unsanitized copy of a portion of the production data set, and then perform sanitizing operations on this copy to produce a portion of the sanitized data set. In another case, the sanitizer 106 can perform sanitization operations on the received portion prior to formal storage, and then store the portion of the sanitized data set. Yet further implementations of the sanitization operation are possible.

As another aside, FIG. 1 illustrates the principal components in the system 100 (e.g., the production environment 102, the sanitizer 106, the transfer functionality 124, and the test environment 104) as separate components. As mentioned above, these separate components can implement their functionality using separate servers, etc. However, in another implementation, one or more of the principal components can be implemented by the same infrastructure. For example, in an alternative case, the production environment 102 can include a server which implements both the production functionality and the sanitizer 106 functionality. In this case, a single server can "internally" implement the transfer of the production data set from the production environment 102 to the sanitizer 106.

A.2. Overview of the Data Sanitizer

With the above introduction regarding the system 100 as a whole, it is now possible to devote further explanation to the sanitizer 106 itself.

Still referring to FIG. 1, the sanitizer 106 includes a sanitizing module 126 which performs the core task of sanitizing the production data set. It performs this task using a data directory table 128. It is the role of a table generating module 130 to create the data directory table 128.

By way of overview, the data directory table 128 identifies all of the data items that need to be sanitized in the production data set. That is, this table 128 identifies the pieces of restricted data (e.g., PII data items and sensitive data items) that need to be sanitized. The data directory table 128 also identifies the location of each instance of the restricted data items in the repositories that make up the production data set. Accordingly, the data directory table 128 serves as a mapping tool that can be used to locate instances of restricted data items in the production data set.

The sanitizing module 126 can apply different tools ("sanitization tools") 132 to sanitize different restricted data items. These tools 132 apply different algorithms or "methods" to sanitize different kinds of restricted data items. To ensure that the proper methods are used to sanitize the restricted data items, the data directory table 128 also stores an indication of the sanitizing tool 132 that should be applied to each data item. This can be implementing by storing a reference which links each restricted data item to a corresponding tool 132. A later subsection provides additional information regarding the exemplary composition of individual sanitization tools 132.

In operation, the sanitizing module 126 sanitizes the production data set by using the data directory table 128 to identify restricted data items that need to be sanitized in the production data set, to identify the locations in the production data set which contain instances of these restricted data items, and to identify the respective sanitizing tools that should be used to sanitize the restricted data items. The sanitizing module 126 then applies the tools 132 to the respective restricted data items, thereby sanitizing these items. The result is the sanitized data set 122, which is forwarded to the transfer functionality 124 upon completion of the sanitizing operation.

One last component of the sanitizer 106 is the transformation module 134. The transformation module 134 performs additional operations on the data set above and beyond the sanitizing operation performed by the sanitizing module 126. The transformation module 134 can operate on the production data set before it is forwarded to the sanitizing module 126, after it is transferred to the sanitizing module 126, or both before and after it is transferred to the sanitizing module 126. Still alternatively, the transformation module 134 can act on the data set in parallel with the sanitizing operations performed by the sanitizing module 126.

The transformation module 134 can perform various kinds of operations on the production data set. In one case, the transformation module 134 reduces the amount of information in the production data set, so that the sanitized data set 122 has fewer records compared to the original production data set. In another case, the transformation module 134 can maintain the same number of records as the production data set, but otherwise compress the records, such that the sanitized data 122 set has a reduced size, in whole, compared to the production data set. One way of compressing the production data set is to replace certain restricted data items with statistical information which describes the data items. For instance, the name "Fred P. Jones" can be replaced with information that simply identifies that this data item describes a name and that this name is eleven characters in length. This has the advantage of both obscuring the information provided by the restricted data items and reducing the size of the resultant sanitized data set 122.

In another case, the transformation module 134 increases the amount of information in the production data set that is supplied to it, so that the sanitized data set 122 has more records compared to the production data set. This can be performed by extrapolating the existing records in the production data set to create additional data records. In another case, the transformation module 134 can aggregate certain features of the production data set when producing the sanitized data set 122. Similar to the compression scenario described above, this has the effect of "blurring" certain features of the individual data items to reveal statistical trends in the data set as a whole. This might be particularly appropriate where the requester 114 is interested in overall trends in the sanitized data set, rather than specific fields of information provided by individual records.

Figure 5:
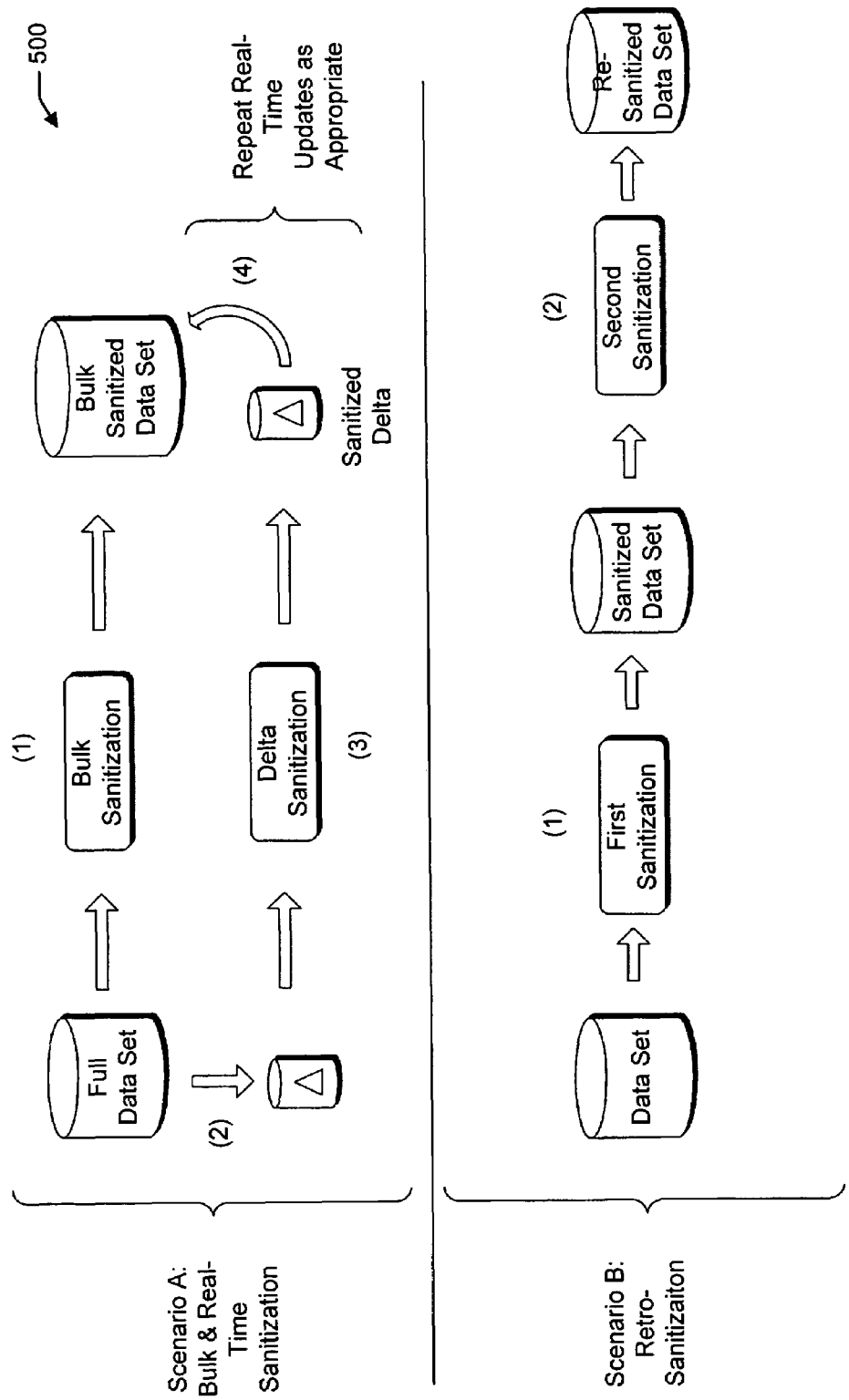
FIGS. 5 and 6 show exemplary scenarios in which the system of FIG. 1 is applied to sanitize data items.
Figure 6:
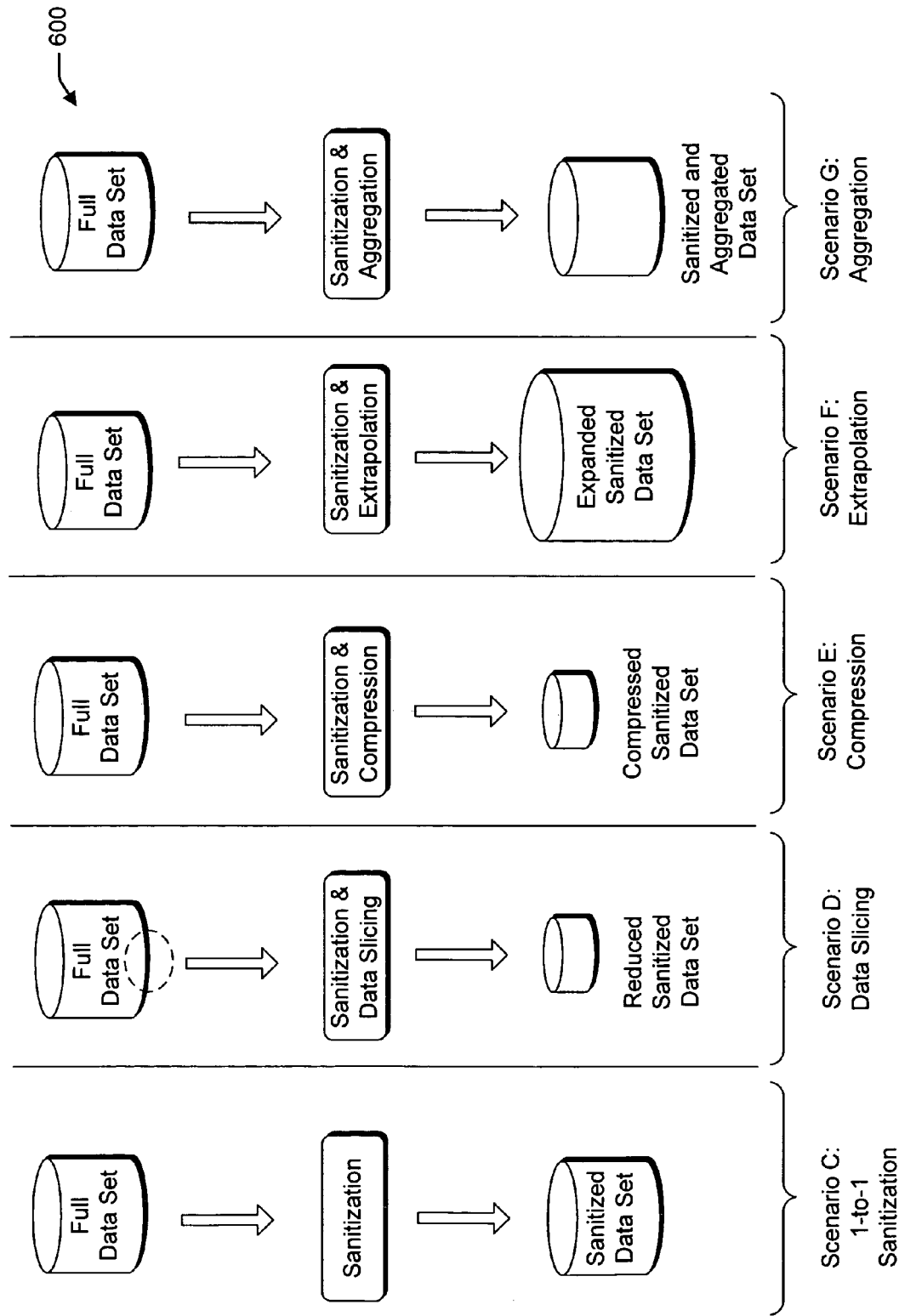

FIGS. 5 and 6, discussed below in turn, provide further details regarding different applications of the sanitizer 106, including different uses of the transformation module 134.

A.3. The Data Generating Module and the Resultant Data Directory Table

Figure 2:
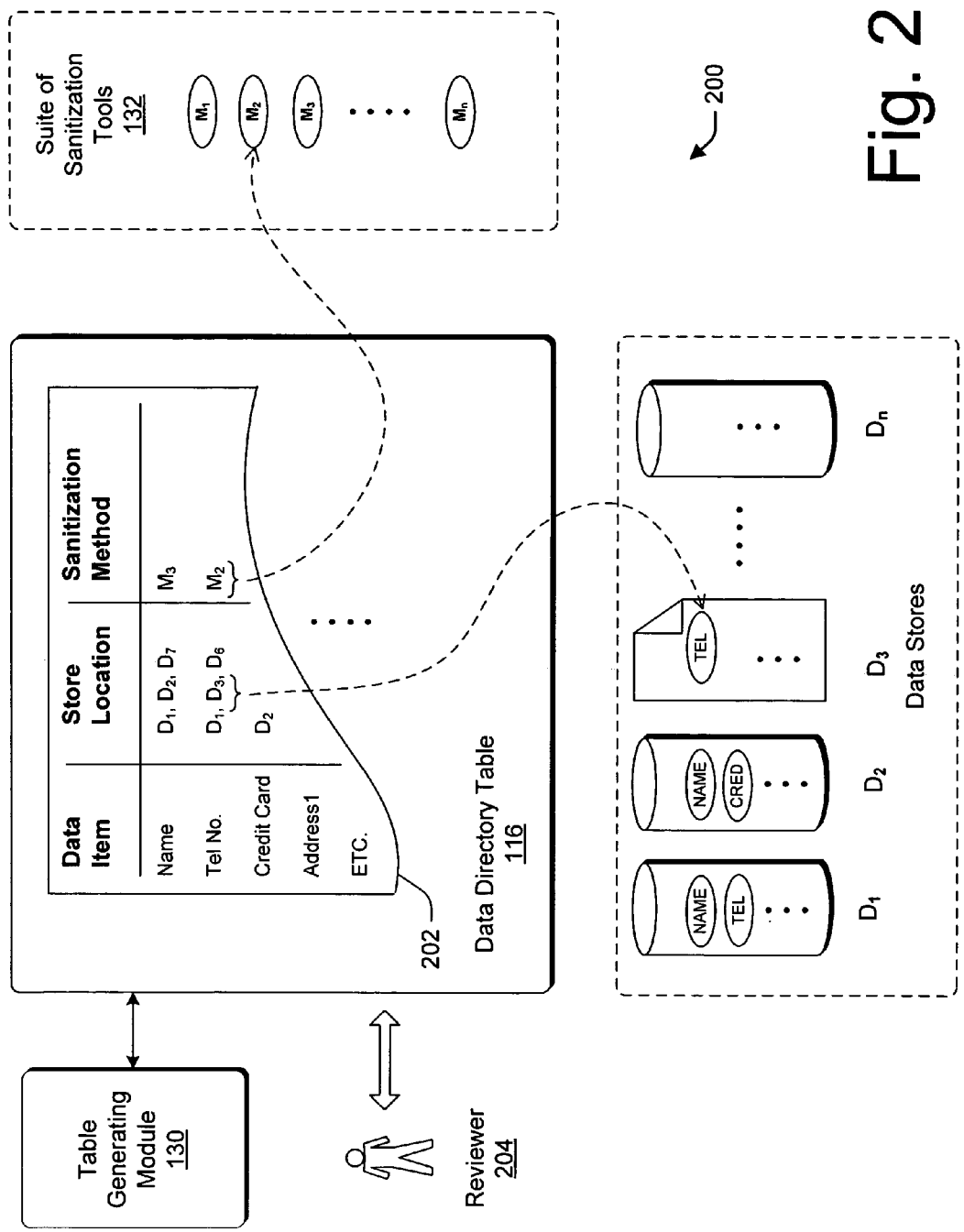
FIG. 2 shows a data directory table for use in the system of FIG. 1.

FIG. 2 describes the table generating module 130 and the data directory table 128 in greater detail.

Starting with the table generating module 130, this module 130 operates by scanning the records in the production data set to identify the data items contained therein. The table generating module 130 also identifies where each instance of each data item is stored in the production data set (or more specifically, the copy of the production data set which is transferred to the sanitizer 106, rather than the original data set which remains intact in the production environment 102). The location of the data items can be identified in various ways depending on the organization of the repositories used to store the data items. In one case, the table generating module 130 can identify: (a) the server which maintains an identified data item; (b) the particular storage unit (e.g., specific database or file) which stores the identified data item; and (c) the particular location within the storage unit where the identified data item can be found. It is typically the case that certain data items will have instances that appear in multiple different locations in the production data set. In this case, the table generating module 130 enumerates all of these locations. FIG. 2 shows a small sample of an entirely exemplary data directory table 202. As indicated there, the data directory table 202 stores the name of each discovered data item (e.g., "name," "Tel No.," "Credit Card," "Address1," and so forth), as well as the locations where instances of each of these data items can be found in the data set (e.g., locations $D_1$-$D_n$). One exemplary dashed line shows how location information in the table 202 points to one exemplary location ($D_3$) in the data set where an instance of the data item "Tel No." can be found.

In one case, the table generating module 130 can generate a data directory table 128 that contains every data item contained in the copy of the production data set, regardless of whether it represents a restricted data item or a non-restricted data item. In this case, the system 100 can rely on a human reviewer 204 to manually examine the data table 128 and manually mark which data items are restricted. In another case, the table generating module 130 can apply predefined rules to tentatively flag data items that may represent restricted data items. The system 100 can then rely on the human reviewer 204 to manually confirm or overrule the automatic classification performed by the table generating module 130. For instance, the table generating module 130 can store a collection of keywords that identifies the names of data items that are frequently classified as restricted (such as "name," "Email," "telephone," and so forth). If these keywords appear in association with a data item in the production data set, then the table generating module 130 tentatively marks that data item as restricted. In one particular case, the final data directory table 128 can contain a listing of all of the data items that appear in the production data set, with each data item marked as restricted or non-restricted. In another case, the final data directory table 128 can only retain data items that have a restricted status.

As shown in FIG. 2, the data directory table 128 can also associate each data item with the sanitization tool that should be applied to sanitize this data item. Namely, as mentioned, the system 100 provides a suite of sanitization tools 132. Different sanitization tools ($M_1$-$M_n$) 132 provide different sanitization techniques (e.g., "methods") used to sanitize different data items. The data directory table 128 maps each entry in the data directory table 128 with the tool ($M_1$-$M_n$) that should be applied to it. A dashed line in FIG. 2 shows one such exemplary linking between an item in the table 128 ("Tel No.") and an associated tool ($M_2$).

The suite of sanitization tools 132 represent modular resources that can be freely coupled and decoupled from the data directory table 128. For instance, an operator can easily change the tool to be applied to any particular data item simply by changing the reference information in the data directory table 128 which links the data item to a particular sanitization tool. Or the operator can modify the referenced sanitization tool in the suite of such tools 132. This approach has numerous advantages. For instance, the modular approach allows the sanitizer 106 to be quickly modified to suit the demands of rapidly changing production environments 102. For instance, consider the case where a certain data item was, by law, classified as an un-restricted data item. But then assume that the law (or company policy) changed, so that this data item was re-classified as restricted. The sanitizer 106 described herein can quickly and efficiently adapt to this change in status by changing the tool-related reference information stored in the data directory table 128, or by changing, in modular fashion, an appropriate one of the suite of sanitization tools 132. A similar modular adaptation can be performed where it is desirable to apply a more rigorous sanitization method to a data item than was previously used, or a less rigorous sanitization method to a data item (e.g., to suit the changing demands of different business environments)

As a conclusion to this subsection, FIG. 2 identifies the use of a single data directory table 128. However, the representation of the data directory table 128 in FIG. 2 is intended to convey only general features of the table 128, rather than its physical organization. In other cases, for instance, the data directory table 128 can be composed of two separate mapping tables, one which maps the data items to their respective locations, and another which maps the data items to their respective associated sanitization tools.

A.4. Exemplary Sanitization Tools

The sanitization tools 132 that can be applied to individual data items are various. However, a few general characteristics apply to many of the tools 132. First, for instance, the tools 132 should modify restricted data items such that these modified items no longer reveal confidential information. One way of addressing this objective is to modify the data items such they do not present any intelligible information at all. This can be performed by replacing the restricted data items with random alpha-numeric characters. Another way of maintaining the secrecy of the restricted data items is to scramble a collection of data records. In this technique, parts of the restricted data items may still appear in the sanitized data set, but it is not possible to reconstruct the original production data set from the jumbled nature of the sanitized data set 122.

Another goal of many of the tools 132 is to preserve certain aspects of the original production data set, while at the same time obscuring the restricted data items. For instance, as described above, the production data set has a certain state at any given time (e.g., describing properties of the records in the data set at any given time). The tools 132 should preferably duplicate the state of the production data set in the sanitized data set 122. Moreover, some of the tools 132 preserve even more fine-grained features of the data items. For instance, some of the tools 132 may determine statistical properties of an original data item and replace the data item with a sanitized version of the data item that has the same statistical properties. Consider the very simple case shown in FIG. 1. A tool can replace the name "Fred P. Jones" with the arbitrary name "John S. Smith" or a random name (e.g., "cnfs d. wtish") because all of these names have the same number of characters.

According to another general feature, some of the tools will produce sanitized data items that remain "functional." The data items are functional in the sense that various applications (116, 118) in the test environment 104 can viably interact with the data items after they have been sanitized. Consider the exemplary case of financial information that is encrypted. The sanitizing tools 132 may alter the content of the information and also change an encryption key for the altered information. This enables an application in the test environment 104 to continue to interact with the financial information in a normal manner.

Another general objective of the tools 132 is to sanitize data items in a consistent manner throughout the data set. For instance, consider the exemplary case in which a certain restricted data item—"name"—appears in multiple different locations in different databases. The sanitizing tools 132 will select one sanitized version of this data item and substitute this version in all locations where the item appears in the data set.

With the above general principles in mind, the following discussion sets forth entirely exemplary rules that can be used to sanitize certain commonly encountered data items. In the following discussion, "Randomizing" refers to assigning random characters to text strings. "Random characters" refers to alphanumeric characters (e.g., in one exemplary implementation, all lowercase alphanumeric characters). Generally, certain features of the methods identified below (such as certain identified Email addresses, etc.) pertain to one concrete exemplary production environment; however, the general principles embodied in these examples can be adapted to suit other production environments.

Exemplary Sanitization Operations

1. Randomly select a unique identifier for another account then swap that unique identifier with the unique identifier for the billable account being sanitized.
2. Randomly select a billable account id for another account then swap that billable account id with the billable account id for the account being sanitized.
3. Randomize the characters in the member name.
4. Change the name of the account:
   a. Randomly select the first name of another account then swap it with the account being sanitized.
      i. If there is a value for the first name pronunciation element for the account that is being sanitized, write the sanitized first name to the first name pronunciation value for the account being sanitized.
   b. Randomly select the last name of another account then swap it with the account being sanitized.
      i. If there is a value for the last name pronunciation element for the account that is being sanitized, write the sanitized last name to the last name pronunciation value for the account being sanitized.
5. Change the email address of the account:
   a. If the domain of the email address is '@msn.com' or '@hotmail.com' (in one exemplary production environment) then change the member name to the member name created in step 2.
   b. If another domain name is used then make the email address the member name in step 2 concatenated with domain '@msn-test.com' (in one exemplary production environment).
6. Randomize the company name.
   a. If there is a company pronunciation element, set it to the randomized value of the company name.
7. Set the phone number for the account:
   a. Leave the phone type as is.
   b. Leave the area code (phone prefix) of the phone number unchanged.
   c. Create a random 7 digit phone number with the first digit set to any number except 1 or 0.
   d. Leave the phone extension as is.
   e. Leave the country code as is.
8. Set the address for the account:
   a. Leave the friendly name as is.
   b. For each character in the street address randomly assign another character.
   c. Leave the city as is.
   d. Leave the district as is.
   e. Leave the state as is.
   f. Leave the country code as is.
   g. Leave the postal code as is.
9. If the account has tax exemptions perform the following steps.
   a. Replace each number in the tax exemption certificate number with a randomly assigned number.
   b. Leave the tax exemption status as is.
   c. Leave the tax exemption date as is.
   d. Leave the tax exemption date added as is.
   e. Leave the tax exemption date received as is.
10. Set the payment instrument for the account:
    a. Leave the payment instrument type as is.
    b. Randomize the friendly name.
    c. If the payment instrument is a credit card do the following:
       i. Hash the account holder name.
       ii. Create a new credit card.
          1. Use the credit card algorithm to generate a new credit card number.
          2. Encrypt the credit card according to the payment instrument encryption process.
       iii. Leave the card type as is.
       iv. Leave the expiration date as is.
    d. If the payment instrument is a debit card do the following:
       i. Apply a one-way hash function to the account holder name.
       ii. Create a new debit card.
          1. Use the debit card algorithm to generate a new debit card number.
          2. Encrypt the debit card according to the payment instrument encryption process.
       iii. Create a random bank code.
       iv. Create a random branch code.
       v. Use the check digits created when the debit card number was created.
    e. If the payment instrument is an external customer payment instrument do the following:
       i. Apply a one-way hash function to the account holder name.
       ii. Create a new external customer payment instrument.
          1. Use a prescribed external customer payment instrument algorithm to generate an external customer payment instrument number.
          2. Encrypt the external payment instrument according to a prescribed payment instrument encryption process.
    f. If the payment instrument is prepaid token do the following:
       i. Apply a one-way hash function to the account holder name.
       ii. Create a new Prepaid Token
          1. Use the prepaid token algorithm to generate a new Prepaid Token number.
          2. Encrypt the prepaid token number according to the payment instrument encryption process.
    g. Hash the payment instrument number then add it to the payment_account table in the map database according to the map algorithm.
    h. Set the phone number according to step 6 above.
    i. Set the address according to step 7 above.
11. Leave the subscription information as is.
12. Comments will be changed to preset strings. Since there are millions of comments in the comment database, it is faster to replace the comments with fixed strings of average comment length than to change each character in the comments.

The above-enumerated tools apply to specific data items. Other tools provide basic methods that have more general application. For instance, an Erase method erases the contents of an identified column of information. A HashString method performs a hashing operation such that the same string is always hashed to the same value. In one illustrative and non-limiting example, applying HashString to an exemplary Name table having the values {John, Marcelo, Smith, Marcelo} will yield {Ctwrt, Grwtraeb, Ytrewq, Grwtraeb}. A FillWithChar method replaces a string with another string of the same length but having random characters. And a FillWithDigit method replaces a number with another number of the same length but having random digits.

In the context of FIGS. 1 and 2, the enumerated rules listed above can constitute separate sanitization tools 132 ($M_1$-$M_n$) that can be referenced in the data directory table 128. The enumerated rules are exemplary. The suite of tools 132 applied to a data set can differ from the rules identified above. Further, the suite of tools 132 can incorporate additional rules to those identified above.

B. Exemplary Operational Characteristics

B.1. General Operation

Figure 3:
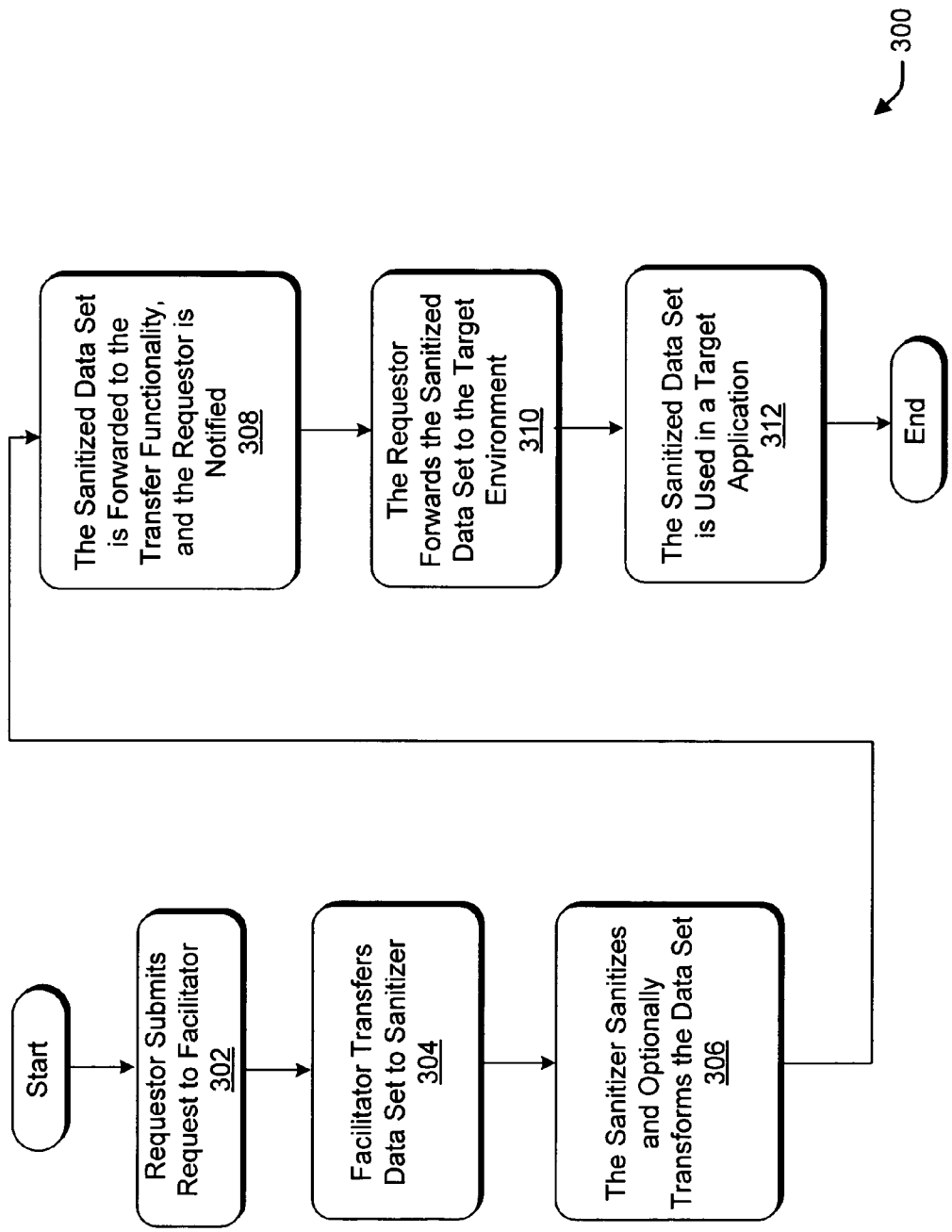
FIG. 3 shows an overall procedure for sanitizing data items using the system of FIG. 1.
Figure 4:
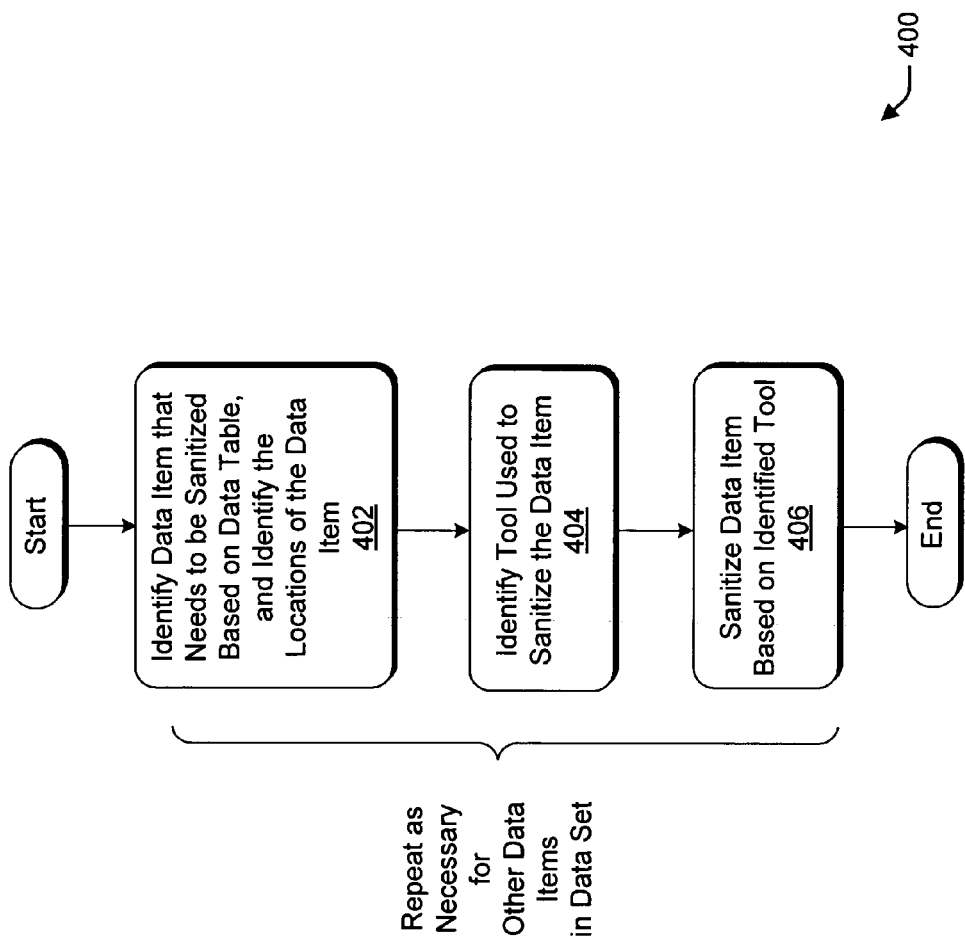
FIG. 4 expands on FIG. 3 by showing a procedure for performing the sanitizing operation itself.

FIGS. 3 and 4 summarize aspects of the above-described subject matter in flowchart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

To begin with, FIG. 3 summarizes an overall procedure 300 for sanitizing data items using the system 100 of FIG. 1. Accordingly, reference will also be made to the functional components shown in FIG. 1.

In step 302, the requestor 114 submits a request to the facilitator 120. As described above, the requestor 114 does not have access rights to directly manipulate the production data set in un-sanitized form, while the facilitator 120 does have such access rights. This is why the facilitator 120 is included in the process. If the requestor 114 has access rights to the production data set, then the role of the facilitator 120 can be eliminated.

In step 304, the facilitator 304 transfers the production data set to the sanitizer 106. This transfer can be performed electronically through a point-to-point coupling, through a network coupling, or manually by transporting removal media.

In step 306, the sanitizer 106 sanitizes the data items (using the procedure shown in FIG. 4 and to be described below). The sanitizer 106 can optionally transform the data set before and/or after sanitizing the data set. Exemplary transformations can act to reduce the sanitized data set 122 relative to the original production data set, or expand the sanitized data set 122 relative to the original production data set.

In step 308, the sanitized data set 122 is transferred to the transfer functionality 124. The transfer functionality 124 can be implemented as a server-type computer which stores the sanitized data set 122 until that time that it is finally transferred to the target environment 102. Step 308 can also involve forwarding a notification to the requestor 114 that alerts the requestor 114 to the fact that the sanitization operation has been completed.

In step 310, the requestor 114 transfers the sanitized data set 122 to the target environment 104. The target environment 104 can implement a testing application 116, a data mining application 118, or some other application.

In step 312, the target application (e.g., application 116 or 118) is run, using the sanitized data set 122.

FIG. 4 is an overview of the operations 400 involved in the actual act of sanitizing data items. In step 402, the sanitizing module 126 identifies an item to be sanitized and also identifies the locations of instances of the item throughout the data set. It does this by identifying the data item in the data directory table 128, and determining, from this table, the locations where instances of this data item appear.

In step 404, the sanitizing module 126 identifies the method to be applied to sanitize the particular data item. Again, the sanitizing module 126 can perform this task by identifying the data item in the data directory table 128, and determining, from this table, the sanitizing tool to be used to sanitize the data item.

In step 406, the data item is sanitized using the identified sanitizing tool. The sanitizing module 126 can repeat the procedure 400 shown in FIG. 4 for reach restricted data item that needs to be sanitized. The result of the procedure 400 is the production of the sanitized data set 122.

B.2. Exemplary Sanitization Scenarios

FIGS. 5 and 6 together show various scenarios (A-G) in which the sanitizer 106 can be employed to sanitize a data set.

Beginning with FIG. 5, scenario A describes an example of so-called bulk sanitization, followed by so-called real-time sanitization. The top sequence of operations corresponds to the bulk sanitization. In bulk sanitization, the sanitizer 106 processes an entire copy of the production data set, or, in any event, a large portion thereof. This yields the sanitized data set 122, which is the sanitized counterpart of the entire copy of the original production data set. Or the sanitizer 106 can perform bulk sanitization by receiving a stream of the production data set (or incremental portions thereof), sanitizing the production data set, and then storing the sanitized data set. In the latter technique, the sanitizer 106 does not necessary have to formally store portions of the original production data set prior to sanitizing it.

As time advances, the production data set in the production environment 102 will likely undergo change. In other words, assume that the production environment 102 continues to function in its normal capacity to deliver its intended services. This will result in various changes in the production data set as records are updated, deleted, added, and so forth. To account for this situation, the system 100 can periodically cull these changes to define a delta data set (denoted in FIG. 5 with a "Δ" symbol within a database symbol). The system 100 can then transfer this delta data set to the sanitizer 106. Such transfer can be initiated either by the production environment 102 or the sanitizer 106. For instance, in one case, the production environment 102 can automatically forward the delta data set to the sanitizer 106 when the quantity of changes in the delta data set reaches a prescribed threshold, or when a preset reporting time occurs. Or the sanitizer 106 can periodically poll the production environment 102 to retrieve the delta data set. Upon receipt of each delta data set, the sanitizer 106 sanitizes the delta data set and optionally integrates this sanitized delta data set into the complete sanitized data set produced by the bulk sanitization. FIG. 5 illustrates the piecemeal sanitization of the delta data set as the bottom-most series of operations in scenario A. This bottom-most series of operations is also referred to as "real-time" sanitization, as it is performed reasonably contemporaneously with the changes that occur in the production environment 102 (compared, at least, to the bulk sanitization, which is performed less frequently). The application of bulk sanitization followed by real-time sanitization is advantageous because it provides an efficient and reliable technique for updating the test environment 104 vis-à-vis the production environment 102.

Scenario B shows an example of so-called retro-sanitization. In this technique the sanitizer 106 processes the production data set in the typical manner described above to produce the sanitized data set 122. Then, this sanitized data set 122 is passed through the sanitizer 106 again to further sanitize it, producing a re-sanitized data set. This sanitization mode may be useful in various circumstances. In one case, the requester 114 may produce a sanitized data set that meets his or her needs at that time. But the requester 114's needs may change. Suppose, for instance, that requester 114 requires that a previously un-restricted data item in the data set be sanitized because it has been re-classified as restricted. To address this need, the requester 114 can pass the sanitized data set 122 through the sanitizer 106 again to yield the re-sanitized data set. It bears noting however, that, because the sanitizing algorithms often apply random permutations to data items, it is not possible to reverse a previous sanitizing operation that has been performed on a particular data item, unless the sanitizer 106 substitutes the original version of the data item (if it still exists and is available) for the sanitized data item.

The two scenarios in FIG. 5 do not necessarily involve any transformation of the data set, beyond, of course, the sanitization operation itself. In contrast, FIG. 6 shows a series of scenarios in which a transformation operation is applied in addition to the sanitization operation. First, for reference, scenario C shows the case where the sanitizer 106 sanitizes a production data set to produce a sanitized data set, where there is an approximate one-to-one correspondence between the amount of information in the source data set and the amount of information in the destination data set. In other words, scenario C shows a reference case in which no transformation is applied.

Scenario D shows the exemplary case where the sanitizer 106 applies data slicing in addition to sanitizing. In data slicing, the transformation module 134 identifies a subset of records in the entire data set, deleting all others. For example, the transformation module 134 may identify an exemplary thousand records out of a more encompassing pool of one million records. To compile a smaller data set that includes the thousand records, the data slicing operation may cull data components from different parts of the entire data set. The sanitizer 106 can then perform sanitization with respect to the smaller data set to produce a correspondingly smaller sanitized data set.

Scenario E also describes the exemplary case where the sanitized data set is smaller in size than the original production data set. However, in scenario E, this is achieved by compressing the records, not by outright elimination of records. In other words, in the example above, the resultant sanitized data set would still include one million records, but the sanitizer 106 would compress these records so that they occupy less storage space compared to the original production data set. One technique for compressing the data set is to store statistical metadata that describes the sanitized information instead of the sanitized alphanumeric complements of the restricted data itself. Consider the example previously described where the sanitizer 106 applies a sanitization tool to obscure the data item <<name: Fred P. Jones >>. One way of sanitizing this data item is to replace the data item with random characters or a fictitious name. But another way to sanitize this data item and also compress it is to simply store a code that indicates that a name was presented in the original data set having a total of eleven characters.

Scenario F shows the exemplary case where the sanitizer 106 applies extrapolation in addition to sanitizing. In the extrapolation, the transformation module 134 expands the number of records in the original production data set such that the final sanitized data set has more records (or other information) than the original production data set. The transformation module 134 can use different techniques to achieve this end result. In one technique, the transformation module 134 can determine the statistical properties of existing records in the original data set, and then synthesize additional data records which conform to the determined statistics. Extrapolation is a useful tool in those instances where it is desirable to predict how the production environment 102 may react to increased loads which may occur in the future.

Finally, scenario G shows the exemplary case where the sanitizer applies aggregation in addition to sanitizing. Aggregating may be viewed as somewhat related to compression. In the aggregation technique, the transformation module 134 can extract certain global properties of the sanitized data set in lieu of preserving individual features of each sanitized record. This technique may be appropriate where a tester is interested in these global properties, and is largely indifferent to the nature of the individual records.

Scenarios A-G are merely representative of the many applications of the sanitizing module 126 and the transformation module 134.

C. Exemplary Implementation Environment

As mentioned above, various components of the system shown in FIG. 1 can be implemented using computer equipment, and, more particularly, using one or more server-type computers. Namely, the production environment 102, the sanitizer 106, the transfer functionality 124, and the target environment 104 can each be implemented using one or more computers in cooperative engagement with one or more databases or other data stores. Or certain plural components shown in FIG. 1 can be implemented by the same server-type computer. In any of these cases, FIG. 7 provides information regarding one exemplary computer environment 700 that can be used to implement any of the functionality provided by the system 100.

The computing environment 700 includes a general purpose type computer 702 and a display device 704. However, the computing environment 700 can include other kinds of computing equipment. For example, although not shown, the computer environment 700 can include hand-held or laptop devices, mainframe computers, and so forth. Further, FIG. 7 shows elements of the computer environment 700 grouped together to facilitate discussion. However, the computing environment 700 can employ a distributed processing configuration. In a distributed computing environment, computing resources can be physically dispersed throughout the environment.

Exemplary computer 702 includes one or more processors or processing units 706, a system memory 708, and a bus 710. The bus 710 connects various system components together. For instance, the bus 710 connects the processor 706 to the system memory 708. The bus 710 can be implemented using any kind of bus structure or combination of bus structures, including a memory bus or memory controller, a peripheral bus, an accelerated graphics port, and a processor or local bus using any of a variety of bus architectures.

Computer 702 can also include a variety of computer readable media, including a variety of types of volatile and non-volatile media, each of which can be removable or non-removable. For example, system memory 708 includes computer readable media in the form of volatile memory, such as random access memory (RAM) 712, and non-volatile memory, such as read only memory (ROM) 714. ROM 714 includes an input/output system (BIOS) 716 that contains the basic routines that help to transfer information between elements within computer 702, such as during start-up. RAM 712 typically contains data and/or program modules in a form that can be quickly accessed by processing unit 706.

Other kinds of computer storage media include a hard disk drive 718 for reading from and writing to a non-removable, non-volatile magnetic media, a magnetic disk drive 720 for reading from and writing to a removable, non-volatile magnetic disk 722 (e.g., a "floppy disk"), and an optical disk drive 724 for reading from and/or writing to a removable, non-volatile optical disk 726 such as a CD-ROM, DVD-ROM, or other optical media. The hard disk drive 718, magnetic disk drive 720, and optical disk drive 724 are each connected to the system bus 710 by one or more data media interfaces 728. Alternatively, the hard disk drive 718, magnetic disk drive 720, and optical disk drive 724 can be connected to the system bus 710 by a SCSI interface (not shown), or other coupling mechanism. Although not shown, the computer 702 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 702. For instance, the readable media can store the operating system 730, application modules 732, other program modules 734, and program data 736. Parts of this media can also provide storage for code that implements aspects of the functionality shown in FIG. 1; for instance, where the computer 702 is used to implement certain aspects of the sanitizer 106, the media can store the code necessary to implement the sanitizer 106's functionality. Other storage shown in FIG. 7 can be allocated to storing the production data set, the sanitized data set, and so forth.

The computer environment 700 can include a variety of input devices. For instance, the computer environment 700 includes the keyboard 738 and a pointing device 740 (e.g., a "mouse") for entering commands and information into computer 702. The computer environment 700 can include other input devices (not illustrated), such as a microphone, joystick, game pad, satellite dish, serial port, scanner, card reading devices, digital or video camera, etc. Input/output interfaces 742 couple the input devices to the processing unit 706. More generally, input devices can be coupled to the computer 702 through any kind of interface and bus structures, such as a parallel port, serial port, game port, universal serial bus (USB) port, etc.

The computer environment 700 also includes the display device 704. A video adapter 744 couples the display device 704 to the bus 710. In addition to the display device 704, the computer environment 700 can include other output peripheral devices, such as speakers (not shown), a printer (not shown), etc.

Computer 702 operates in a networked environment using logical connections to one or more remote computers, such as a remote computing device 746. The remote computing device 746 can comprise any kind of computer equipment, including a general purpose personal computer, portable computer, a server, a game console, a network extension device, and so forth. Remote computing device 746 can include all of the features discussed above with respect to computer 702, or some subset thereof.

Any type of network 748 can be used to couple the computer 702 with remote computing device 746, such as a WAN, a LAN, point-to-point coupling, etc. The computer 702 couples to the network 748 via network interface 750, which can utilize broadband connectivity, modem connectivity, DSL connectivity, or other connection strategy. Although not illustrated, the computing environment 700 can provide wireless communication functionality for connecting computer 702 with remote computing device 746 (e.g., via modulated radio signals, modulated infrared signals, etc.). In the context of the system 100 shown in FIG. 1, the above-described coupling can be used to couple different components of the system 100 together, and so forth.

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for sanitizing restricted data items in a data set to prevent the revelation of the restricted data items, comprising:

transferring an original data set from a production environment to a sanitizer, the original data set being characterized by a state and including a plurality of data items stored in a plurality of different locations corresponding to separate data stores;

generating a data directory table, which is separate from the original data set, by:
identifying a plurality of different data items within the original data set;
classifying the data items as having a restricted or non-restricted status; and
mapping the restricted data items to their respective locations within the original data set;

sanitizing at least a portion of the original data set using the sanitizer, while preserving the state of the original data set, the sanitizing comprising:
identifying the locations of the restricted data items in the original data set,
wherein identifying the locations of the restricted data items comprises using the data directory table to identify the locations of the restricted data items in the original data set;
identifying at least one sanitizing tool, from a plurality of sanitizing tools, to apply to the restricted data items which have been located in the original data set, wherein identifying the at least one sanitizing tool utilizes a stored reference in the data directory table which links the restricted data items to the at least one sanitizing tool, wherein each of the plurality of sanitizing tools:
modify the restricted data items by transforming the restricted data items so that at least one statistical feature of the restricted data items is preserved;
apply different randomizing algorithms transforming different types of restricted data items, wherein the different algorithms assign characters to text strings as a substitution to the restricted data items; and
produce sanitized data items that remain functional such that one or more applications in a testing environment can interact with the sanitized data items such that analysis and testing can be realized;
applying said at least one sanitizing tool to the restricted data items which have been located in the original data set to provide a sanitized data set, wherein
applying said at least one sanitizing tool to the restricted data items comprises a bulk sanitization operation;

forwarding the sanitized data set to a target environment; and in an event that the original data set has changed subsequent to the bulk sanitization operation, performing a delta sanitization operation to sanitize the restricted data items in the original data set which have changed subsequent to the bulk sanitization operation.

2. The method of claim 1, wherein the transferring comprises:

receiving, by a facilitator, a request from a requestor to initiate the sanitization of the restricted data items, wherein the requestor does not have access to the original data set in the production environment, whereas the facilitator does have access to the original data set in the production environment; and commanding, by the facilitator, the transfer of the original data set from the production environment to the sanitizer.

3. The method of claim 2, further comprising sending the requestor a notification upon the completion of the sanitizing of the original data set, wherein, upon receiving such notification, the requestor initiates the forwarding of the sanitized data set to the target environment.

4. The method of claim 1, wherein the target environment is a testing environment in which a tester applies a test to the sanitized data set.

5. The method of claim 1, wherein the target environment is a data mining environment in which an analyst applies mining analysis to the sanitized data set.

6. The method of claim 1, wherein the sanitizing of the original data set comprises an initial sanitization operation to produce the sanitized data set, and further comprising, subsequent to the initial sanitization operation, performing another sanitization operation on the sanitized data set to produce a re-sanitized data set.

7. The method of claim 1, wherein the sanitizing of the original data set comprises identifying a subset of the original data set, and performing the sanitizing on only that subset of the original data set.

8. The method of claim 1, where the sanitizing of the original data set comprises producing the sanitized data set so that the sanitized data set has a reduced size relative to the original data set.

9. The method of claim 1, wherein the sanitizing of the original data set comprises producing the sanitized data so that the sanitized data set has an expanded size relative to the original data set.

10. One or more computer-readable storage media for implementing the method of claim 1.

11. A system for sanitizing restricted data items in a data set to prevent the revelation of the restricted data items, comprising:

one or more processors;

a memory coupled to the one or more processors, the memory having computer-executable instructions embodied thereon, the computer-executable instructions, when executed by the one or more processors, configuring the system to sanitize the restricted data items;

a production environment which relies on a production data set to perform its allotted functions;

a data directory table; and a sanitizer configured to receive an original data set based on the production data set and to sanitize the original data set by:

using the data directory table to identify locations of the restricted data items in the original data set;

using the data directory table to identify at least one sanitizing tool, from a plurality of sanitizing tools, to apply to at least one of the restricted data items which have been located in the original data set, wherein the data directory table identifies the at least one sanitizing tool by storing a reference which links the at least one of the restricted data items to a corresponding sanitizing tool, wherein each of the plurality of sanitizing tools:

modify the restricted data items by transforming the restricted data items so that at least one statistical feature of the restricted data items is preserved;

apply different randomizing algorithms transforming different types of the restricted data items, wherein the different algorithms assign characters to text strings as a substitution to the restricted data items; and produce sanitized data items that remain functional such that one or more applications in a testing environment can interact with the sanitized data items such that analysis and testing can be realized;

applying said at least one sanitizing tool to the at least one of the restricted data items which have been located in the original data set to provide a sanitized data set wherein the applying said at least one sanitizing tool to the at least one of the restricted data items comprises a bulk sanitization operation;

forwarding the sanitized data set to a target environment configured to receive the sanitized data set; and in an event that the original data set has changed subsequent to the bulk sanitization operation, performing a delta sanitization operation to sanitize the restricted data items in the original data set which have changed subsequent to the bulk sanitization operation; and wherein the sanitizing preserves a state of the original data set.

12. A sanitizer for sanitizing restricted data items in a data set to prevent the revelation of the restricted data items, comprising:

one or more processors;

a memory coupled to the one or more processors, the memory having computer-executable instructions embodied thereon, the computer-executable instructions, when executed by the one or more processors, configuring the sanitizer to sanitize the restricted data items;

a data directory table;

a sanitizing module configured to receive an original data set based on a production data set used in a production environment, and to sanitize the original data set by:

using the data directory table to identify locations of the restricted data items in the original data set;

using the data directory table to identify at least one sanitizing tool, from a plurality of sanitizing tools, to apply to at least one of the restricted data items which have been located in the original data set, wherein the data directory table identifies the at least one sanitizing tool by storing a reference which links the at least one of the restricted data items to a corresponding sanitizing tool, wherein each of the plurality of sanitizing tools:

modify the restricted data items by transforming the restricted data items so that at least one statistical feature of the restricted data items is preserved;

apply different randomizing algorithms transforming different types of the restricted data items, wherein the different algorithms assign characters to text strings as a substitution to the restricted data items; and produce sanitized data items that remain functional such that one or more applications in a testing environment can interact with the sanitized data items such that analysis and testing can be realized; and applying said at least one sanitizing tool to the at least one of the restricted data items which have been located in the original data set to provide a sanitized data set, wherein the applying said at least one sanitizing tool to the at least one of the restricted data items comprises a bulk sanitization operation;

forwarding the sanitized data set to a target environment configured to receive the sanitized data set; and in an event that the original data set has changed subsequent to the bulk sanitization operation, performing a delta sanitization operation to sanitize the restricted data items in the original data set which have changed subsequent to the bulk sanitization operation; and wherein the sanitizing module is configured to sanitize the original data set while preserving a state of the original data set.

13. The sanitizer of claim 12, further comprising a table generating module configured to generate the data directory table by:

identifying data items within the original data set;

classifying the data items as having restricted or non-restricted status; and mapping the restricted data items to their respective locations within the original data set.

14. The sanitizer of claim 12, further comprising a transformation module configured to identify a subset of the original data set, and wherein the sanitizing module is configured to perform the sanitizing on only that subset of the original data set.

15. The sanitizer of claim 12, further comprising a transformation module, which, together with the sanitizing module, is configured to produce the sanitized data set so that the sanitized data set has a reduced size relative to the original data set.

16. The sanitizer of claim 12, further comprising a transformation module, which, together with the sanitizing module, is configured to produce the sanitized data set so that the sanitized data set has an expanded size relative to the original data set.

17. The sanitizer of claim 12, wherein:

the data directory table identifies the at least one sanitizing tool to sanitize the at least one restricted data item because the identified at least one sanitizing tool is preferred over any other sanitizing tool for the at least one restricted data item.

\* \* \* \* \*